United States Patent [19]

Witte et al.

[11] 3,969,492

[45] July 13, 1976

[54] RECOVERY OF ELEMENTAL SULFUR FROM SULFUR DIOXIDE BEARING WASTE GASES

[75] Inventors: Michael Witte, Chatham; Manankumar S. Mehta, Parsippany, both of N.J.

[73] Assignee: U.S. Filter Corporation, New York, N.Y.

[22] Filed: Oct. 29, 1973

[21] Appl. No.: 410,540

[52] U.S. Cl. .............................. 423/574 L; 423/242
[51] Int. Cl.² ......................................... C01D 17/04
[58] Field of Search .................... 423/242, 574, 539; 55/73

[56] References Cited

UNITED STATES PATENTS

| | | | |
|---|---|---|---|
| 2,142,987 | 1/1939 | Bacon et al. | 423/539 |
| 3,431,072 | 3/1969 | Rozie et al. | 423/551 |
| 3,630,672 | 12/1971 | Potts | 423/242 |
| 3,633,339 | 11/1972 | Wiewiorowski | 423/242 |
| 3,767,777 | 10/1973 | Frye et al. | 423/575 |

FOREIGN PATENTS OR APPLICATIONS

| | | | |
|---|---|---|---|
| 1,240,753 | 7/1971 | United Kingdom | 423/575 |
| 599,073 | 3/1948 | United Kingdom | |

*Primary Examiner*—G. O. Peters
*Attorney, Agent, or Firm*—Robert E. Isner

[57] ABSTRACT

Process for effecting the selective removal of sulfur dioxide values from industrial waste gases or the like and conversion thereof to elemental sulfur wherein a particularly constituted solution of mixed ammonium phosphates is exposed to absorbent contact with the sulfur dioxide bearing gas stream followed by recovery of the sulfur values therefrom and regeneration of the absorbent solution preparatory to reexposure thereof to the sulfur dioxide bearing gas stream.

1 Claim, 1 Drawing Figure

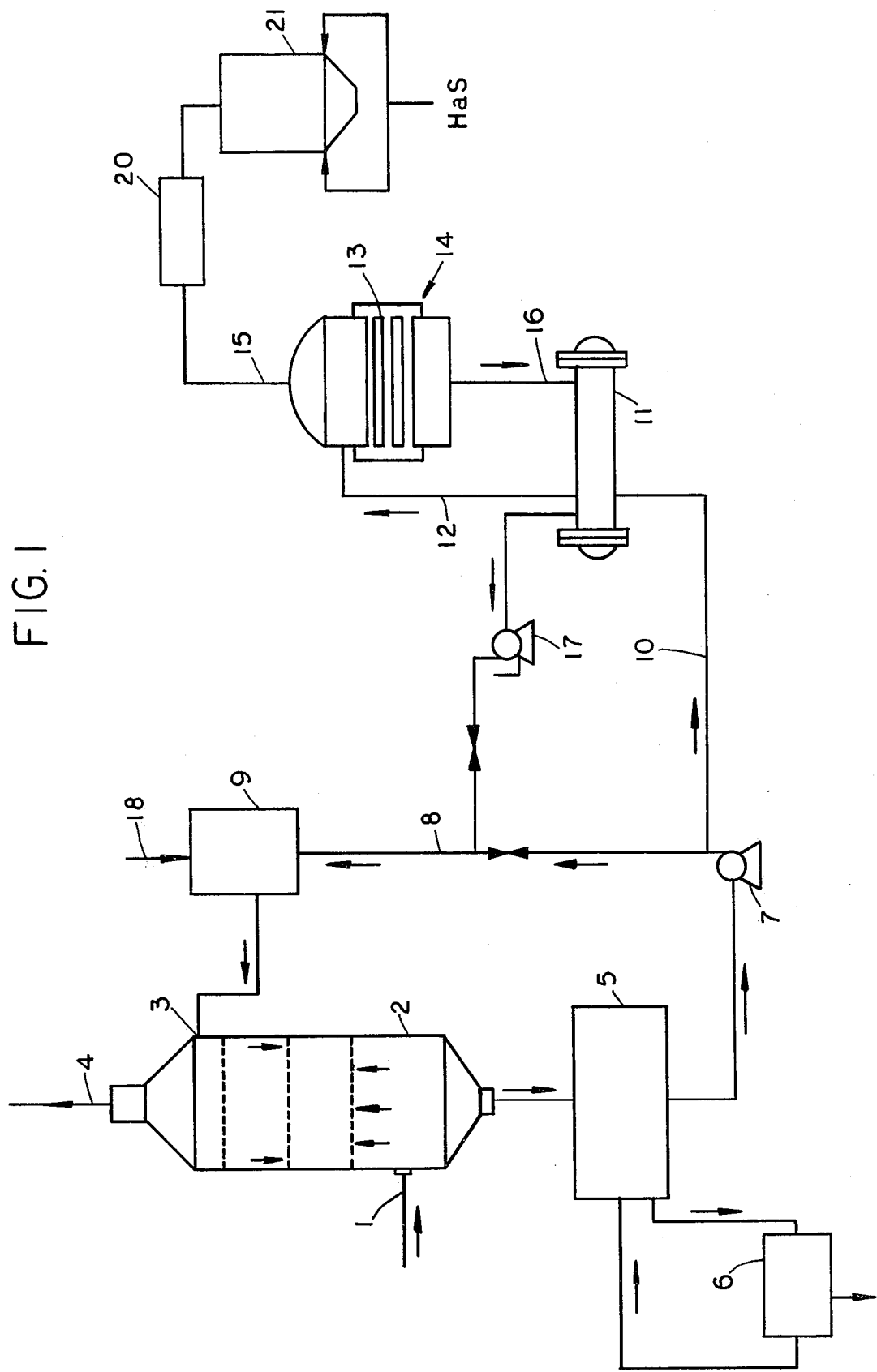
FIG. I

RECOVERY OF ELEMENTAL SULFUR FROM SULFUR DIOXIDE BEARING WASTE GASES

This invention relates to the removal of sulfur dioxide from gas streams and more particularly to an improved process for continuously removing sulfur dioxide values from industrial waste gases and recovering the sulfur values therefrom.

The ever increasing quantitative atmospheric emission of sulfur dioxide, which largely results from the combustion of sulfur-bearing fossil fuels in the smelting of metals and in the generation of electric power, poses such serious public health and associated property damage problems as to render the efficient and practical removal of sulfur dioxide from such industrial waste gases a major objective in the overall national effort for effecting environmental controls. The magnitude and importance of the problem has resulted in a concerted and accelerated widespread effort, over the past years, to develop high efficiency, low cost and commercially practical methods for effecting such sulfur dioxide removal and the technical literature is replete with diverse proposals and suggestions as to how this desirable end might be attained. While such diverse efforts have, from a purely chemical standpoint, been attended with varying degrees of success, the attainment of high efficiency and continuously operable low cost system that is essentially compatible with the physical parameters attendant existing industrial waste gas handling systems and which is, moreover, readily adapted to widespread usage has not, as yet, been commercially realized.

This invention may be briefly described as an improved process for effecting the selective removal of sulfur dioxide values from a sulfur dioxide-bearing industrial waste gas stream such as, for example, generated in the smelting of metals, through the selective absorption thereof in mixed phosphate salt solutions followed by the recovery of sulfur from and regeneration of the absorbent solution preparatory to its re-exposure to the sulfur dioxide bearing waste gas stream. In its broader aspects, the subject invention includes the introduction of a sulfur dioxide-bearing gas stream under ambient conditions into absorbent contact with selectively constituted solutions of mixed ammonium phosphate salts to effect the selective removal of the sulfur dioxide values therefrom followed by a direct recovery of elemental sulfur from the sulfur dioxide enriched solution in association with the regeneration and reintroduction of the sulfur dioxide depleted and reconsituted mixed phosphate salt solution into renewed absorbent contact with the sulfur dioxide bearing waste gas stream. In its somewhat narrower aspects the subject invention includes the introduction of a sulfur dioxide bearing gas stream into absorbent contact with a confined and at least partially recycled absorbent solution of a mixture of particularly consitututed mono and di-ammonium phosphate salts followed by the reduction of the absorbed $SO_2$ values to elemental sulfur by exposure to $H_2S$ and regeneration and reintroduction of the absorbent mixed phosphate salt solution into absorbent contact with the sulfur dioxide bearing waste gas stream.

Among the advantages of the subject invention is the provision of an economic process for effecting the removal of readily recoverable sulfur dioxide values from sulfur dioxide-bearing gas stream, such as industrial waste gases; a permitted utilization of readily controllable operating parameters and consequently facilitated automatic operation over extended periods of time; a permitted economic utilization of available waste heat values in selected operational phases thereof; and a basic operational compatability with the physical parameters of existing conventional industrial waste gas systems.

The principal object of this invention is the provision of an improved process for effecting the economic removal of sulfur dioxide values from industrial waste gases.

Another object of this invention is the provision of a process for effecting the selective removal of sulfur dioxide values from sulfur dioxide bearing gas streams and recovery thereof as a high purity elemental sulfur product.

Other objects and advantages of the subject invention will become apparent from the following specification and claims and from the accompanying drawings which illustrate, in accord with the mandate of the patent statute, the principles of the invention in association with schematically illustrative apparatus by which the operative steps of the subject method may be carried out.

The appended drawing is a schematic flow diagram illustrating certain operative process steps incorporating the principles of this invention.

The subject process desirably contemplates an absorption system in which a selectively constituted solution of mixed mono- and di-ammonium phosphate salts is disposed in intimate absorbent contact with a sulfur dioxide bearing waste gas stream to effect a selective removal of the sulfur dioxide values therefrom and from which such sulfur dioxide values are subsequently reduced to provide both a high purity elemental sulfur product, and a regenerated solution of the mixed phosphate salts for subsequent re-exposure to the sulfur dioxide bearing waste gas stream.

While evidence to date indicates that the use of a particularly constituted mixed solution of mono-ammonium phosphate and di-ammonium phosphate is preferred as the absorbent medium, certain organic ammonium phosphates, such as alkyl and aryl ammonium phosphates, also appear to be basically operable, because of their better than marginally acceptable reaction rates in both the absorption and desorption of sulfur dioxide; their high solubility in water and their general stability under the operating conditions involved.

In the preferred practice of the invention, the absorption of the sulfur dioxide values from the waste gas stream employs a particularly constituted mixed mono- and di-ammonium phosphate salt solution. Economic operation dictates that such mixed mono- and di-ammonium phosphate salt solution desirably be maintained as close to a saturated condition under the ambient conditions as is possible in the absorber cycle of the process, which, as will be pointed out at a later point in this specification, is the lower temperature operating zone of the system, albeit such lower temperature being maintained at a value sufficiently above that of a water vapor saturated and sulfur dioxide bearing gas stream that is being treated so as to minimize, if not prevent, undesired water vapor condensation therein. Of greater significance, however, is the required quantitative proportioning of monoammonium phosphate to diammonium phosphate in such solution due to their respectively markedly different absorption and desorption characteristics. Desirably, such solution is of a mixture concentration of about 300 to 500 grams/liter of monoammonium phosphate and about 30 to 125 grams/liter of diammonium phosphate and in which the proportion by weight of monoammonium phosphate to diammonium phosphate in the absorbent solution is in the range of about 4 to 1 to about 10 to 1, with the lower range proportions of about 4 : 1 to about 6 : 1 being preferred.

While not fully understood at the present time, it is believed that the specified proportions of mono- and diammonium phosphates and the maintenance of substantially saturated solution thereof are such as to result in a permitted highly efficient and ready thermal desorption of the sulfur dioxide values therefrom with minimal loss of carrier reagent due to oxidation or other decomposition and yet provide a practical carrier reagent that will effect a satisfactory quantitative, and yet qualitatively selective, absorption of sulfur dioxide in preference to other acidic gases normally present in utility and waste gases, such as carbon monoxide and carbon dioxide.

In such absorber phase of the cycle in the preferred practice of the invention, the reactions that proceed, in the removal of sulfur dioxide values from a water vapor-saturated gas stream, are believed to be as follows:

$$NH_4H_2PO_4 + SO_2 + H_2O \rightarrow NH_4HSO_3 + H_3PO_4 \quad (1)$$

$$(NH_4)_2HPO_4 + SO_2 + H_2O \rightarrow NH_4HSO_3 + NH_4H_2PO_4 \quad (2)$$

Among the organic amine phosphates that have at least some demonstrated affinity for $SO_2$ removal are included the phosphate salts and prefereably mixture of phosphate salts of ethanolamine, diethanolamine and triethanolamine; phosphates of dimethylaniline, such as

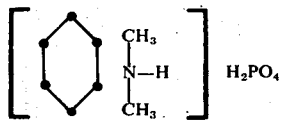

and phosphates of teriary octylamines, e.g., $R'NH_2$ phosphate where R is an aliphatic group with a large number of carbon atoms such as in

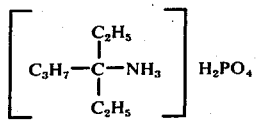

In the practice of this invention, the $SO_2$ enriched absorbent solution is treated by $H_2S$ gas or other suitable reducing agents to effect a direct reduction of the sulfur values therein to elemental sulfur. The basic reaction involves $$SO_2 + 2H_2S \rightarrow 3S + 2H_2O \quad (3)$$

In a sulfur dioxide enriched mixed ammonium phosphate absorbent solution as disclosed above, direct exposure to $H_2S$ gas results in a high yield of precipitated elemental sulfur. The reaction involves the products of Equation (1) and (2), namely $$H_3PO_4 + NH_4HSO_3 + 2H_2S \rightarrow 3S + NH_4H_2PO_4 + 3H_2O \quad (4)$$

$$NH_4HSO_3 + NH_4H_2PO_4 + 2H_2S \rightarrow 3S + (NH_4)_2HPO_4 + 3H_2O \quad (5)$$

Thus, by way of example, preliminary desorption of the selectively absorbed sulfur dioxide values from the preferred aqueous solution of monoammonium phosphate and diammonium phosphate may be readily effected by thermal stripping in a higher temperature operating zone of the system to provide either a sulfur dioxide-rich inert gas stream or a wet sulfur dioxide gas, together with a regenerated phosphate and diammonium phosphate for subsequent re-exposure in the absorber cycle to the sulfur dioxide bearing gas stream.

It is operationally desirable that such thermally induced desorption be effected in the presence of a minimal amount of oxygen so as to minimize, if not prevent, for example, the irreversible oxidation of the attendant ammonium bisulfite to bisulfate form, i.e.

$$2NH_4HSO_3 + O_2 \rightarrow 2NH_4HSO_4 \quad (6)$$

and to permit the desired thermally induced regeneration of the mixed mono- and diammonium phosphate salt solution, i.e.

$$NH_4HSO_3 + H_3PO_4 \xrightarrow{\Delta} NH_4H_2PO_4 + SO_2 + H_2O \quad (7)$$

$$NH_4HSO_3 + NH_4H_2PO_4 \xrightarrow{\Delta} (NH_4)_2HPO_4 + SO_2 + H_2O \quad (8)$$

to take place with effectively minimal losses thereof through oxidation or other factors. As will be apparent, the presence of $SO_2$ in the gaseous effluent permits its subsequent collection and treatment with $H_2S$ in the manner described above.

As will be apparent, essentially similar reactions would be involved in the thermally induced stripping of the organic phosphate salts disclosed above.

As described in copending application Ser. No. 410,448 filed Oct. 29 1973, such thermally induced desorption can be effected by the utilization of superheated steam which not only supplies the necessary thermal values but which can also serve to provide an inert oxygen limited atomsphere and to assure operations at a sufficiently high temperature as to preclude condensation of water vapor, at least to an extent that would materially affect the volume and resultant concentration of the aqueous mixed phosphate solutions that serves as the carrier reagent for the system.

Such thermal stripping may also be effected by the utilization of heat from any suitable source, as for example waste heat from the system generating the waste gas being treated to evaporate the sulfur dioxide enriched absorbent solution and drive off both $SO_2$ and $H_2O$ therefrom. In such a modification, water of course must be replaced to properly reconstitute the absorbent solution before its re-exposure to the waste gas stream being treated.

Continuous operation of a system embodying the disclosed process at a high efficiency level requires the maintenance of the selectively consitituted carrier reagent in the absorbent phase of the system. As is now apparent from the absorption and desorption equations set forth above, in situations where thermal stripping is effected before H₂S treatment, operations are desirably effected in such manner as to minimize, if not totally avoid, the addition and/or loss of water during the absorption and desorption phases thereof. To the above ends, the sulfur dioxide-bearing waste gas should be saturated with water vapor at the time of its absorbent contact exposure with the selectively constituted aqueous mixed mono-and di-ammonium phosphate solution and should also be at a lower temperature than that of such absorbent salt solution. In instances where the waste gas to be treated is emanating from a wet scrubber or other wet type removant of particulates, the waste gas usually will be in the requisite water-vapor saturated condition without the need for water-vapor content adjustment. In other instances wherein particulate removal has been effected by dry type separation apparatus, as for example by passage of the waste gas through a baghouse, it will normally be necessary to introduce sufficient water vapor into the gas stream to raise it to a water-vapor saturated condition under the ambient conditions contemplated herein. Likewise, water should not be added or, if possible, removed from the basic carrier reagent solution in the desorber cycle and such is facilitated by the conjoint use of superheated steam as the thermal stripping agent in association with the raising of the temperature of the sulfur dioxide-bearing portions of the carrier reagent solution prior to the actual desorption operations, so as to minimize, if not avoid, undesired steam condensation therein. Water losses from the system, as for example as might occur in the desorber cycle are readily replaced through a make up line or the like.

In the preferred practice of this invention, economic operation dictates employment of the selectively constituted mixed aqueous solution of mono and diammonium phosphate at as high a salt concentration as is practicable in any given installation. In fact, operations should desirably proceed with such solution being as near to a saturated condition under the ambient conditions as it is feasible to safely maintain with preclusion of significant crystallization in the absorber cycle which will, because of the temperature of the waste gas to be treated at the point of entry, be the locus of the lowest temperatures extant within the system. Thus, the temperature of the selectively constituted mixed aqueous solution of mono and diammonium phosphate must be maintained at a value greater than that of the entry temperature of the waste gas to be treated and preferably such solution must be maintained at least 10°F. thereabove, at the point of waste gas entry into and during waste gas passage through the locus of absorption. All carrier reagent solution temperatures elsewhere in the system will be appreciably higher than this minimum value.

As will now be apparent to those skilled in this art, the herein disclosed absorption-desportion-reduction process is additionally characterized by a ready adaptability to continuous operation under automated control. The temperature parameters are such as to be readily and easily sensed and monitored by conventional regulating equipment adapted to continually sense temperatures at selected locations and initiate corrective actions if the sensed values exceed a predetermined magnitude of departure from a norm thereof. Likewise, both the volume of carrier reagent solution and mixed salt concentrations therein can be continuously monitored by conventional volumetric control regulators and by pH control monitors for the carrier reagent solutions at the points of entry and exit from the loci of absorption and desorption and at any other desired location within the system.

Referring now to the drawing by way of presently preferred example, a water-vapor saturated sulfur dioxide-bearing gas stream such as an industrial waste gas emanating from a smelter or the like at an exemplary temperature of about 120°–140°F, is introduced, as at 1, into the lower portion of a gas-liquid contact device generally designated 2, such as a scrubber or the like. A substantially saturated aqueous solution of about 4 parts of monoammonium phosphate to one part of diammonium phosphate and having a pH in the range of about 4.5 to 6.0 is introduced, preferably at a temperature at least 10°F above that of the gas being treated, into the upper portion of the gas liquid contact device 2, as at 3, for disposition in intimate absorbent contact with the sulfur dioxide-bearing waste gas therewithin. Preferably, counter-current gas-liquid flow is employed in the contact device 2 and the sulfur dioxide stripped waste gas exits from the top 4 thereof. The effluent carrier reagent solution, now bearing the absorbed sulfur dioxide values and having a lower pH exits from the bottom of the gas-liquid contact device 2 and is accumulated in a holding reservoir 5, which is desirably heated so as to prevent a drop in temperature of the carrier reagent solution and detrimental crystallization of the solids content thereof. Such effluent carrier reagent solution may be intermittently or continuously cycled through an adjacent filter 6 to assure that all crystallites or other solid or particulate matter is removed therefrom.

A predetermined portion of the effluent carrier reagent solution is directly recycled by the pump 7 through the holding tank 9 back into the gas-liquid contact device 2 to increase the amounts of sulfur dioxide absorbed therein, since such selectively constituted carrier reagent solution normally will not, on one pass through the contact device 2, absorb the maximum possible amount of sulfur dioxide. The amount of recycled carrier reagent solution is selected, for any given installation, so as to effect operation at a realistically maximum level of sulfur dioxide absorption and to provide an effluent solution removably transferable to the desorption stage that is substantially saturated with sulfur dioxide in terms of the reaction mechanismus of equations (1) and (2) above.

Such sulfur-dioxide bearing effluent carrier reagent solution is also cycled by the pump 7 through the conduit 10 into a heat exchanger 11, conveniently serviceable by the available waste heat in the industrial gas stream being treated, wherein the solution temperature is desirably raised to just under that of its boiling point, as for example to about 210°–220°F under atmospheric pressure conditions. The resultant elevated temperature carrier reagent solution is then introduced, via line 12, into the upper portion of a second gas-liquid contact device 13 in which desorption of the sulfur dioxide values is effected by thermal stripping at the boiling point of the carrier reagent solution, i.e. 215°–220°F, by countercurrent flow contact thereof with superheated steam introduced as at 14. Preferred operation should be characterized by little or no steam condensation in the desorber unit 13 and such can be effectively attained by having the steam exit therefrom still in superheated condition.

As evidenced by equations (7) and (8) supra, the stripped sulfur dioxide values exit from the desorber unit via line 15 together with the water-vapor and superheated steam carrier therefor and are suitably condensed into a dilute sulfurous acid solution in condenser 20. Such diluted solution is transferred to a reaction vessel 21, into which $H_2S$ gas is introduced to reduce the $SO_2$ values to elemental sulfur. The precipitated sulfur is periodically withdrawn from the vessel 21, and further treated, if necessary, for disposal thereof as a significantly valuable product. The regenerated or reconstituted carrier reagent solution, now at a pH of about 4.5 to 6, exiting from the desorber unit 13 via line 16 is desirably passed through the heat exchanger 11 to reduce its temperature prior to its reintroduction, by the action of pump 17, into the line 8 for reentry into the holding tank 9 and into the absorber unit 2 together with the predetermined quantum of effluent carrier reagent solution portion recycled directly via pump 7 thereto.

The holding tank 9, into which make up water or other reagents may be added by line 18, facilitates the monitoring and requisite modification of the requisite temperature, concentration and pH characteristics of the mixed aqueous solution of monoammonium phosphate and diammonium phosphate prior to its reentry into the absorber unit 2.

In lieu of the use of superheated steam as described above, thermal stripping of the $SO_2$ enriched solution may be effected by the evaporation thereof either partially to effect selective removal of $SO_2$ values therefrom or, entirely to provide a sulfate supplemented upgraded phosphate product. In either case the $SO_2$ bearing effluent may be treated with $H_2S$ in the manner described above for recovery of elemental sulfur therefrom.

Of course, while generally an aqueous medium is contemplated as the carrier reagent vehicle or solvent medium for the salt solution in question, such aqueous medium need not be solely water. As described above, it may contain an organic component, preferably an inert organic liquid, as well, although the predominant component of the aqueous medium should be water, i.e., to the extent of at least 50% or 60%, and preferably 75% or 80%, by weight of water. Although it is not completely understood at the present time, it is believed that such organic fluids not only serve to influence the pH of the particular system involved but also render the same more compatible where the absorption-desorption system is based upon the use of organic ammonium phosphates rather than or in addition to inorganic ammonium phosphates.

The following examples are set forth by way of illustration, and not limitation, of the present invention. In a limited liquid volume bench test setup, compressed air having sulfur dioxide introduced therein to provide a test gas mixture of a composition generally akin to an industrial waste gas or flue gas and containing:

| Constituent | % by vol. | % by weight |
|---|---|---|
| $N_2$ | 64.06 | 67.0 |
| $O_2$ | 14.43 | 17.26 |
| $H_2O$ | 19.57 | 13.17 |
| $SO_2$ | 0.36 | 0.86 |
| Remainder | 1.57 | 1.71 | comprising miscellaneous gases such as $CO_2$ and others commonly found in compressed air was contacted in countercurrent flow at a gas temperature of about 150°F with an aqueous salt solution being recirculated through an absorption zone. The salt solution at the start of the run had an average inlet composition of 450 gram/liter $NH_4H_2PO_4$ and 100 gram/litter $(NH_4)HPO_4$, a weight ratio of $NH_4H_2PO_4 : (NH_4)_2HPO_4$ of 4.5 : 1, a corresponding molar ratio of $NH_3 : H_3PO_4$ of 1.162 : 1, and a specific gravity at 140°F of 1.25. The average temperature of the salt solution at the absorption zone inlet was about 178°F and about 162°F at its outlet. The outlet waste gas effluent from the absorber zone had a temperature of 140°F.

The overall efficiency of the system, i.e. $SO_2$ recovered/total $SO_2$ introduced into the system; for the limited size and limited liquid flow laboratory equipment was as follows:

| Ex. No. | Overall Efficiency | L/G | Desorber medium |
|---|---|---|---|
| 1 | 70 | 28 | Super heated steam |
| 2 | 63 | 20 | Super heated steam |
| 3 | 62.7 | 28 | hot nitrogen |
| 4 | 63 | 25 | electric coil heating | where L/G is representative of the gallons of solution employed per 1000 cubic feet of saturated gas being treated. The thermally stripped effluent is, in each instance, in a condition for recovery of elemental sulfur by treatment with $H_2S$ in the manner described above.

As will be apparent to those skilled in this art, marked increases in overall efficiency will inherently result when the L/G ratio are increased from those herein limited by the physical capacities of the bench type setup.

Having thus described our invention, we claim:
1. In the removal of sulfur dioxide values from a sulfur dioxide bearing industrial gas stream,
   the steps of
   introducing a sulfur dioxide bearing gas stream, into absorbent contact with an aqueous solution of mixed mono-ammonium phosphate and di-ammonium phosphate in which the weight proportion of mono- to di-ammonium phosphate is in the range of about 4 to 1 to about 10 to 1 to effect removal of sulfur dioxide values from said gas stream in said solution,
   and reacting said absorbed sulfur dioxide values in said solution with hydrogen sulfide to reduce the sulfur therein to elemental sulfur.

* * * * *